(12) United States Patent
Iizuka et al.

(10) Patent No.: US 10,903,524 B2
(45) Date of Patent: Jan. 26, 2021

(54) RESIN COATED METAL LAMINATE, BATTERY PACKAGE, AND BATTERY

(71) Applicant: FUJIMORI KOGYO CO., LTD., Tokyo (JP)

(72) Inventors: Hirokazu Iizuka, Tokyo (JP); Yasuhiro Kaneda, Toyko (JP); Yuki Sato, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 41 days.

(21) Appl. No.: 15/649,420

(22) Filed: Jul. 13, 2017

(65) Prior Publication Data

US 2018/0019502 A1  Jan. 18, 2018

(30) Foreign Application Priority Data

Jul. 15, 2016 (JP) ................................. 2016-140797

(51) Int. Cl.
| | | |
|---|---|---|
| *H01M 10/0585* | (2010.01) | |
| *H01M 2/02* | (2006.01) | |
| *H01M 2/08* | (2006.01) | |
| *H01M 2/10* | (2006.01) | |
| *H01M 10/0587* | (2010.01) | |

(52) U.S. Cl.
CPC ..... *H01M 10/0585* (2013.01); *H01M 2/0287* (2013.01); *H01M 2/0292* (2013.01); *H01M 2/08* (2013.01); *H01M 2/029* (2013.01); *H01M 2/0217* (2013.01); *H01M 2/10* (2013.01); *H01M 10/0587* (2013.01)

(58) Field of Classification Search
CPC .. H01M 10/0585; H01M 2/08; H01M 2/0292; H01M 2/0287; H01M 2/0217; H01M 10/0587; H01M 2/10; H01M 2/029
See application file for complete search history.

(56) References Cited

U.S. PATENT DOCUMENTS

| | | |
|---|---|---|
| 2014/0087241 A1 | 3/2014 | Kuramoto et al. |
| 2014/0242333 A1 | 8/2014 | Oono et al. |

(Continued)

FOREIGN PATENT DOCUMENTS

| | | | | |
|---|---|---|---|---|
| JP | 2010-194759 A | 9/2010 | | |
| JP | 2014-218633 | * 11/2014 | ............ | C09J 123/00 |

(Continued)

OTHER PUBLICATIONS

Machine translation of WO 2011/093283, Ishikawa et al., 2011 (Year: 2011).*

(Continued)

*Primary Examiner* — Maria Laios
*Assistant Examiner* — Kwang Han
(74) *Attorney, Agent, or Firm* — Hauptman Ham, LLP

(57) ABSTRACT

The present invention relates to a resin coated metal laminate comprising at least a sealant layer, a barrier layer, and a substrate layer in this order, wherein the barrier layer includes stainless steel having a thickness of 50 μm or less, the substrate layer includes a polyamide as a main component, a thickness of the substrate layer is thinner than a thickness of the barrier layer, and a maximum value of tensile strength in a tensile test of the substrate layer is 25 N/mm or more, as well as a battery package and a battery using the resin coated metal laminate.

9 Claims, 6 Drawing Sheets

(56) References Cited

U.S. PATENT DOCUMENTS

| | | | |
|---|---|---|---|
| 2015/0030910 A1* | 1/2015 | Minamibori | B29C 51/14 |
| | | | 429/163 |
| 2015/0104593 A1* | 4/2015 | Minamibori | H01M 2/0287 |
| | | | 428/35.7 |
| 2017/0009312 A1 | 1/2017 | Unno et al. | |
| 2017/0279090 A1* | 9/2017 | Amano | B41J 3/4073 |

FOREIGN PATENT DOCUMENTS

| | | | |
|---|---|---|---|
| JP | 2015044626 A | 3/2015 | |
| JP | 2015-77978 A | 4/2015 | |
| KR | 10-2014-0007932 A | 1/2014 | |
| KR | 10-2014-0099446 A | 8/2014 | |
| KR | 10-1444570 B1 | 9/2014 | |
| KR | 1020150014361 A | 2/2015 | |
| KR | 1020150043991 A | 4/2015 | |
| WO | 2011/093283 A1 | 8/2011 | |
| WO | WO 2011/0932283 * | 8/2011 | B32B 15/08 |
| WO | 2015/122523 A1 | 8/2015 | |

OTHER PUBLICATIONS

Machine translation of JP 2014-218633, Iizuka et al., 2014 (Year: 2014).*

Office Action in KR Application No. 10-2017-0087752, dated Sep. 17, 2018, 10pp.

Office Action for Korean Patent Application No. 10-2017-0087752 dated Mar. 21, 2019 and English translation thereof; 9 pgs.

Rejection for Amendment and Final Rejection for Korean Patent Application No. 10-2017-0087752 dated Sep. 2, 2019 and English translation thereof; 8 pgs.

Notice of Allowance for Korean Patent Application No. 10-2017-0087752 dated Oct. 29, 2019 and English translation thereof; 2 pgs.

Office Action for Japanese Patent Application No. 2016-140797 dated Jan. 21, 2020 and English translation thereof; 13 pgs.

Ingredients & Types, Physical Property Comparing Lists, Table for comparison of the physical properties of the material and type, TOYOBO Co., Ltd., Jan. 8, 2020 online, Internet the URL,https://www.toyobo.co.jp/seihin/film/package/list/type.html (documents showing the nature of the products); copy right 1996-2016; 5 pgs.

Office Action for Korean Patent Application No. 10-2019-0121255 dated Apr. 17, 2020 and English translation thereof; 11 pgs.

Office Action for Chinese Patent Application No. 201710569114.1 dated Jun. 5, 2020 and English translation thereof; 10 pgs.

Office Action for Japanese Patent Application No. 2016-140797 dated Sep. 15, 2020 and English translation thereof; 16 pgs.

Office Action for Korean Patent Application No. 10-2019-0121255 dated Oct. 22, 2020 and English translation thereof; 7 pgs.

* cited by examiner

RESIN COATED METAL LAMINATE, BATTERY PACKAGE, AND BATTERY

CROSS-REFERENCE TO RELATED APPLICATIONS

This application claims the priority from Japanese Patent Application No. 2016-140797 (filing date: Jul. 15, 2016). The entire teachings of the above application are incorporated herein by reference.

BACKGROUND OF THE INVENTION (1) Field of the Invention

The present invention relates to a resin coated metal laminate, a battery package, and a battery.

(2) Description of Related Art

In the fields of packages and wrappers used in packaging, wrapping or the like of industrial products such as electronic equipment and batteries, and daily necessities such as foods, drinks, cosmetics, and medicaments, a resin coated metal laminate obtained by combining and laminating resin films such as polyethylene and polypropylene and metal foils such as aluminum foil is used.

For example, as a package used in a battery such as a secondary battery, for the purpose of miniaturization and light weighting, the above-mentioned resin coated metal laminate (battery packaging laminate) is used. Such a battery packaging laminate is molded into a package container body, by drawing or the like so that it becomes to have a tray-like shape having a concave part in a part thereof. Additionally, according to the same manner as that of the above-mentioned package container body, a battery packaging laminate is molded to obtain a package lid part. After a battery body is accommodated into the above-mentioned concave part of this package container body, an end of the above-mentioned package lid part is folded back so as to cover the accommodated battery body, and a container body and a side edge of the package lid part are adhered, thereby, a battery in which the battery body is accommodated in the package is obtained.

The above-mentioned package and wrapper are required to have the function such as the gas barrier property, durability (heat resistance, water resistance, and chemical resistance), and for example, a package which is configured to comprise at least a sealant layer, a barrier layer, and a substrate layer in this order, or the like is known (see Japanese Unexamined Patent Application, First Publication No. 2015-044626). In such a package or the like, the barrier layer exhibits mainly the gas barrier property, the substrate layer plays a role in improving the strength and moldability of the package and the like, and in some cases, improving the design property, and the sealant layer is sealed by heat fusion bonding or the like.

SUMMARY OF THE INVENTION

However, it was found out that when a step of folding a part of a molded body composed of the resin coated metal laminate is performed, there arises a problem that a folded site is broken in the above-mentioned laminate during this step or in a workpiece which is obtained via this step. That is, in the resin coated metal laminate, a break is generated in the substrate layer by an elongation stress or a rubbing force which is generated at an elongated site at the time of folding thereof. Due to this break of the substrate layer, a disadvantage is also generated at a step of manufacturing an objective product, the yield is reduced and, further, in a battery package which was manufactured using this laminate, quality thereof is deteriorated. Such a disadvantage is remarkable in a package in which a barrier layer is composed of stainless steel, or the like. The barrier layer composed of stainless steel is excellent in workability, durability, and the like in addition to the gas barrier property, and this is preferable, but conversely, a folded site easily forms a sharp shape, and the substrate layer in the vicinity thereof is easily damaged due to influence thereof.

The present invention was made in view of the above-mentioned circumstances, and an object thereof is to provide a resin coated metal laminate which is configured to comprise at least a sealant layer, a barrier layer, and a substrate layer in this order, wherein the barrier layer includes stainless steel, and even when used by folding, damage of the substrate layer at this folded site can be suppressed, as well as a battery package and a battery using the resin coated metal laminate.

In order to solve the above-mentioned problems, the present invention provides a resin coated metal laminate comprising at least a sealant layer, a barrier layer, and a substrate layer in this order, wherein the barrier layer includes stainless steel having a thickness of 50 µm or less, the substrate layer includes polyamide as a main component, a thickness of the substrate layer is thinner than a thickness of the barrier layer, and a maximum value of tensile strength in a tensile test of the substrate layer is 25 N/mm or more.

In the resin coated metal laminate of the present invention, it is preferable that a result of an Elmendorf tear strength test concerning a laminated test piece obtained by laminating only the substrate layer so that a total thickness becomes equivalent to 100 µm is 20 (g/100 µm equivalent lamination) or more.

In the resin coated metal laminate of the present invention, it is preferable that the thickness of the substrate layer is 15 µm or less, and the thickness of the barrier layer is 50 µm or less.

In the resin coated metal laminate of the present invention, a mat layer containing fine particles may be laminated on the substrate layer.

The resin coated metal laminate of the present invention may comprise a surface protective layer on the mat layer.

The resin coated metal laminate of the present invention may comprise an adhesive layer on one surface of the substrate layer, the adhesive layer may include adhesive (i), adhesive (ii) or adhesive (iii) below:

adhesive (i): urethane-based adhesive adhesive (ii): adhesive including a mixture of a polyolefin-based resin as a base resin and isocyanate as a curing agent adhesive adhesive including a mixture of a polyolefin-based resin as a base resin and an epoxy-based resin as a curing agent.

Also, the present invention provides a resin coated metal laminate comprising at least a sealant layer, a barrier layer, and a substrate layer in this order, wherein the barrier layer includes stainless steel, and exposure of a layer adjacent to the substrate layer associated with destruction of the substrate layer is not seen as a result of a rubbing test below:

rubbing test: a test piece is prepared by folding the resin coated metal laminate into two so that a surface on a side opposite to a side of the substrate layer on which the sealant layer is provided becomes convex, an outermost surface of the twofold site of the test piece is contacted with a smooth side of a stainless-steel bar having a diameter of 1.5 cm, to arrange the test piece, and the test piece is rubbed by reciprocating the test piece 99 times a distance of one-way 10.0 cm in a longitudinal direction of the stainless steel-bar, while applying a load of 200 g to the test piece.

It is preferable that the resin coated metal laminate of the present invention is for use in battery packaging.

Also, the present invention provides a battery package comprising the resin coated metal laminate, wherein the battery package has an interior space for accommodating a battery, and a sealant layer side of the resin coated metal laminate becomes a side of the interior space.

Also, the present invention provides a battery comprising the battery package.

According to the present invention, there are provided a resin coated metal laminate which is configured to comprise at least a sealant layer, a barrier layer, and a substrate layer in this order, wherein the barrier layer includes stainless steel, and even when used by folding, damage of the substrate layer at this folded site is suppressed, as well as a battery package and a battery using the resin coated metal laminate.

DETAILED DESCRIPTION OF THE INVENTION

<Resin Coated Metal Laminate>

Figure 1:
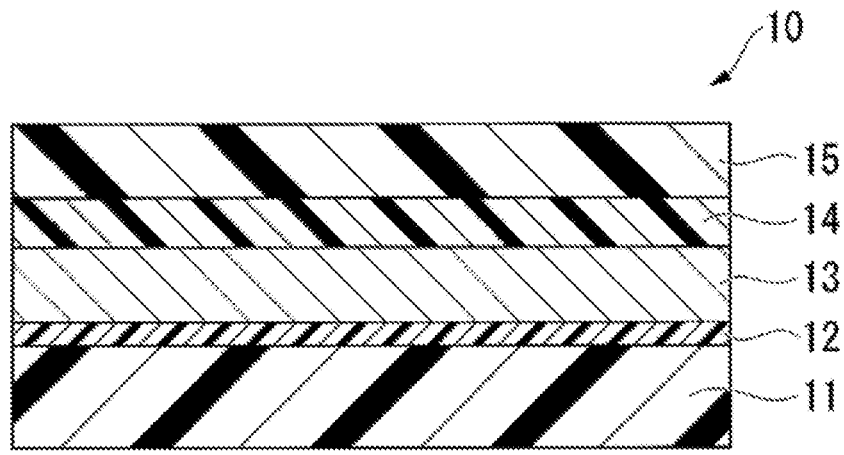
FIG. 1 is a sectional view schematically showing one embodiment of a resin coated metal laminate of the present invention.

The resin coated metal laminate of the present invention is provided with at least a sealant layer, a barrier layer, and a substrate layer in this order, wherein the barrier layer includes stainless steel having a thickness of 50 μm or less, the substrate layer includes polyamide as a main component, a thickness of the substrate layer is thinner than a thickness of the barrier layer, and a maximum value of tensile strength in a tensile test of the substrate layer is 25 N/mm or more.

When a package provided with a sealant layer, a barrier layer, and a substrate layer in this order, the barrier layer including stainless steel, is folded so that a surface on a side opposite to a side of the substrate layer on which the sealant layer is provided becomes convex, usually, a folded site of the barrier layer easily forms a sharp shape. Therefore, by application of a force to this convex site by repeating contact with other site, damage such as a break, a tear, and a cut is generated at the substrate layer at this convex site, and a layer such as the barrier layer is exposed more easily on a sealant layer side than on a substrate layer side. This is particularly remarkable when the substrate layer includes polyethylene terephthalate (PET).

The barrier layer including stainless steel is more excellent and more preferable than the barrier layer made of other metal, in workability, durability, and the like in addition to the gas barrier property, but on the other hand, it has the above-mentioned problems.

In contrast, in the resin coated metal laminate of the present invention, by using a substrate layer including a polyamide as a main component and having a smaller thickness than a thickness of the barrier layer as described above, damage of the substrate layer is suppressed without deteriorating good working suitability, even when the barrier layer includes stainless steel and the laminate is folded so that the surface becomes convex as described above. Herein, "working suitability" means property that generation of distortion (curling) due to stainless steel (barrier layer) is suppressed, and working at a later step becomes easy, in the resin coated metal laminate.

The resin coated metal laminate of the present invention having such property is suitable for use as a package or a wrapper of daily necessities such as foods, drinks, cosmetics, medicaments, and batteries, and inter alia, is particularly suitable for use as a package of batteries (for battery packaging).

The present invention will be illustrated below in detail, referring to the drawings. In addition, in the figures used in the following illustration, for making characteristics of the present invention clear, for convenience, parts which are to be a main part will be sometimes shown by enlargement, and the dimensional ratio of each constituent element or the like is not necessarily the same as the actual dimensional ratio.

FIG. 1 is a sectional view schematically showing one embodiment of the resin coated metal laminate of the present invention.

A resin coated metal laminate 10 shown herein is provided with a sealant layer 11, a corrosion-preventing layer 12, a barrier layer 13, an adhesive layer 14, and a substrate layer 15 in this order, in a thickness direction thereof.

Figure 2:
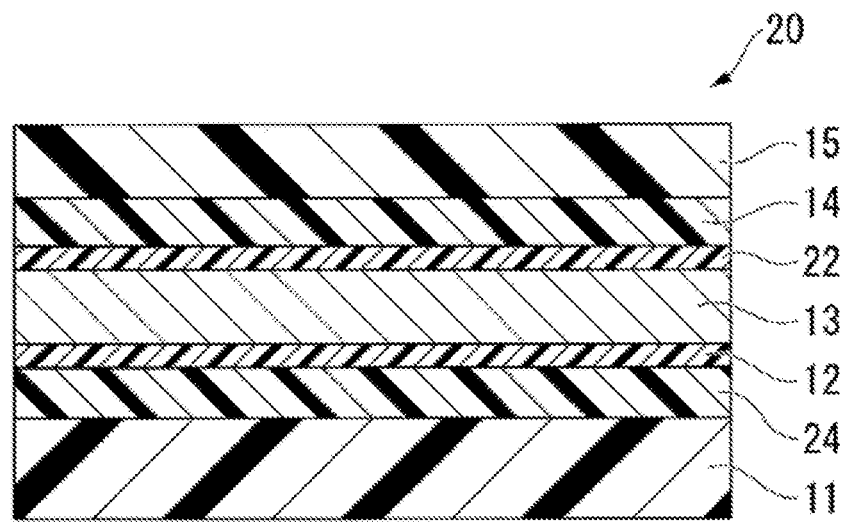
FIG. 2 is a sectional view schematically showing another embodiment of a resin coated metal laminate of the present invention.

A resin coated metal laminate 20 shown in FIG. 2 is a sectional view schematically showing another embodiment of the resin coated metal laminate of the present invention. The resin coated metal laminate 20 is provided with a sealant layer 11, a second adhesive layer 24, a first corrosion-preventing layer 12, a barrier layer 13, a second corrosion-preventing layer 22, a first adhesive layer 14, and a substrate layer 15 in this order, in a thickness direction thereof. The sealant layer 11, the first corrosion-preventing layer 12, the barrier layer 13, the first adhesive layer 14, and the substrate layer 15 in the resin coated metal laminate 20 are the same as the sealant layer 11, the corrosion-preventing layer 12, the barrier layer 13, the adhesive layer 14, and the substrate layer 15 in the resin coated metal laminate 10, respectively.

Figure 3:
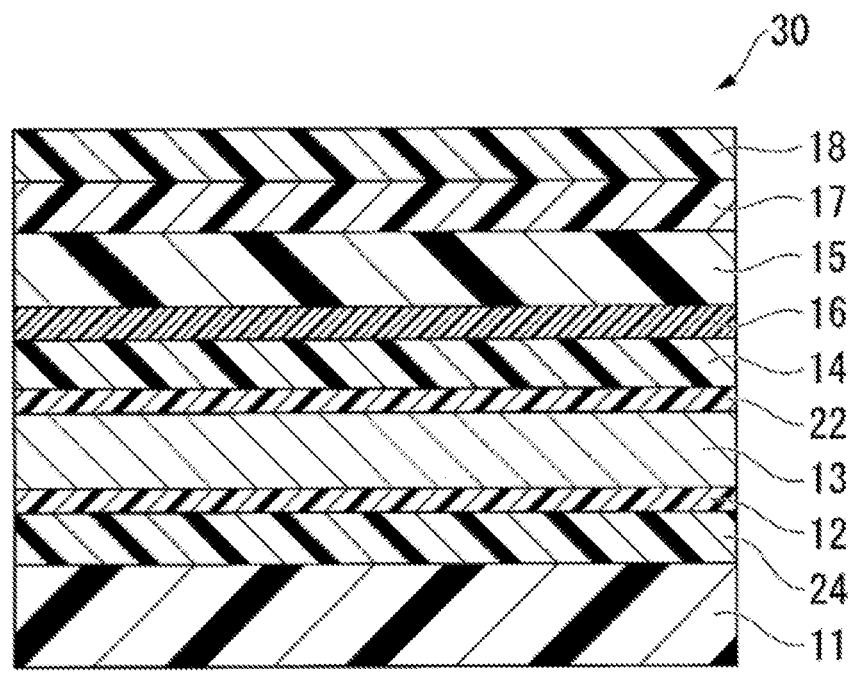
FIG. 3 is a sectional view schematically showing still another embodiment of a resin coated metal laminate of the present invention.

FIG. 3 is a sectional view schematically showing another embodiment of the resin coated metal laminate of the present invention, which is provided with both of the above-mentioned second adhesive layer and second corrosion-preventing layer.

A resin coated metal laminate 30 shown in FIG. 3 is provided with a sealant layer 11, a second adhesive layer 24, a first corrosion-preventing layer 12, a barrier layer 13, a second corrosion-preventing layer 22, a first adhesive layer 14, a colored layer 16, a substrate layer 15, a mat layer 17, and a surface protective layer 18 in this order, in a thickness direction thereof.

As described above, in addition to the resin coated metal laminate shown in FIG. 1, resin coated metal laminates shown in FIGS. 2 and 3 were further illustrated, but these resin coated metal laminates are merely an example of the present invention, and the laminate may be other resin coated metal laminates in which a feature of a part of these resin coated metal laminates is changed, deleted or added within such a range that the effect of the present invention is not deteriorated.

For example, when the above-mentioned resin coated metal laminate is provided with the substrate layer and the colored layer, if the substrate layer is made to contain a coloring agent, the colored layer may be omitted.

[Sealant Layer]

The sealant layer 11 is a layer which enables the resin coated metal laminate 10, 20 or 30 to be mutually adhered by heat sealing.

The sealant layer 11 is not particularly limited, as far as it is a layer having such function, but it is preferable that a material constituting the layer is polyolefin, in terms of easy availability, the heat-sealing property, and the like.

Examples of the above-mentioned polyolefin include polyethylene, polypropylene, poly-1-butene, polyisobutylene, a random copolymer of propylene and ethylene or α-olefin, a block copolymer of propylene and ethylene or α-olefin, and the like.

Among them, in terms of improvement in an adhering force, the above-mentioned polyolefin is preferably a polypropylene-based resin such as homopolypropylene (propylene homopolymer; may referred to as "homo-PP" in the present specification), a block copolymer of propylene-ethylene (hereinafter, may referred to as "block PP" in the present specification), and a random copolymer of propylene-ethylene (hereinafter, may referred to as "random PP" in the present specification), more preferably homo-PP or block PP, and in terms of the excellent mechanical strength, particularly preferably block PP.

A melting point of a material constituting the sealant layer 11 is not particularly limited, as far as the sealant layer 11 has heat resistance which is required in the resin coated metal laminates 10, 20, 30.

The sealant layer 11 may be composed of one layer (monolayer), or may be composed of a plurality of layers of two or more layers. When the sealant layer 11 is composed of a plurality of layers, these plural layers may be the same or different, and a combination of these plural layers is not particularly limited, as far as the effect of the present invention is not deteriorated.

In addition, in the present specification, being not limited to the case of the sealant layer 11, "plural layers may be the same or different" means that "all layers may be the same, all of the layers may be different, or only a part of layers may be the same", and further, "plural layers are different" means that "at least one of a constituent material and a thickness of each layer is different".

A thickness of the sealant layer 11 is not particularly limited, but is preferably 1 to 50 μm, and more preferably 5 to 30 μm.

Herein, the "thickness of the sealant layer 11" means a thickness of an entire sealant layer 11, and for example, a thickness of the sealant layer 11 composed of a plurality of layers means a total thickness of all layers constituting the sealant layer 11.

[Barrier Layer]

The barrier layer 13 plays an important role for reducing leakage of the content sealed in the resin coated metal laminates 10, 20, 30 (for example, liquid leakage of battery), in the resin coated metal laminates 10, 20, 30. For example, the barrier layer 13 includes a constituent material having the high mechanical strength, reduces generation of pinholes when a concave part for accommodating an objective product in the resin coated metal laminates 10, 20, 30 is formed by drawing, and reduces leakage of the content sealed in the resin coated metal laminates 10, 20, 30 (for example, liquid leakage of battery).

It is preferable that the barrier layer 13 is composed of a thin layer of stainless steel, for example, stainless steel which was extended thin (stainless-steel foil). Stainless steel is preferable in terms of workability, strength (piercing strength, tensile strength or the like), corrosion resistance, and the like.

Examples of stainless steel include austenitic-based, ferritic-based, martensitic-based stainless steels, and the like. Examples of austenitic-based stainless steel include SUS304, SUS316, SUS301, and the like. Examples of ferritic-based stainless steel include SUS430 and the like. Examples of martensitic-based stainless steel include SUS410 and the like.

The barrier layer 13 may be composed of one layer (monolayer), or may be composed of a plurality of layers of two or more layers. When the barrier layer 13 is composed of a plurality of layers, these plural layers may be the same or different, and a combination of these plural layers is not particularly limited, as far as the effect of the present invention is not deteriorated.

A thickness of the barrier layer 13 is 50 μm or less, and preferably 30 μm or less. Furthermore, a thickness of the barrier layer 13 is preferably 5 to 30 μm, and more preferably 10 to 30 μm, and for example, may be 10 to 20 μm. By having a thickness of the barrier layer 13 of the above-mentioned lower limit value or more, the mechanical strength of the resin coated metal laminates 10, 20, 30 is more improved, and for example, when the resin coated metal laminates 10, 20, 30 are used as a package of a battery such as a secondary battery, durability of the battery is more improved. Additionally, by having a thickness of the barrier layer 13 of the above-mentioned upper limit value or less, thinning of the resin coated metal laminates 10, 20, 30 and improvement in drawing moldability become possible.

Herein, the "thickness of the barrier layer 13" means a thickness of an entire barrier layer 13, and for example, a thickness of the barrier layer 13 composed of a plurality of layers means a total thickness of all layers constituting the barrier layer 13.

[Corrosion-Preventing Layer]

The first corrosion-preventing layer 12 (corrosion-preventing layer 12) and the second corrosion-preventing layer 22 are a surface treating layer for preventing corrosion of the barrier layer 13 due to rust or the like (rustproofing).

In the resin coated metal laminates 10, 20, 30, the first corrosion-preventing layer 12 (corrosion-preventing layer 12) and the second corrosion-preventing layer 22 are arbitrary constituent parts, and for example, the resin coated metal laminates 20 and 30 may have a configuration having ether the first corrosion-preventing layer 12 or the second corrosion-preventing layer 22. It is preferable that the resin coated metal laminates 10, 20, 30 are provided with the first corrosion-preventing layer 12 (corrosion-preventing layer 12), in order to prevent corrosion caused by the content. When the resin coated metal laminates 10, 20, 30 are used for battery packaging, there is a possibility that a chemical solution such as an electrolytic solution leaks out from the included battery, and since such a leaked out chemical solution can corrode the barrier layer 13, it is preferable that the resin coated metal laminates 10, 20, 30 are provided with the first corrosion-preventing layer 12 (corrosion-preventing layer 12).

It is preferable that the first corrosion-preventing layer 12 (corrosion-preventing layer 12) and the second corrosion-preventing layer 22 include a metal halide compound, and it is more preferable that they include a metal halide compound, a water-soluble resin, and either or both of a chelating agent and a crosslinking compound.

The first corrosion-preventing layer 12 (corrosion-preventing layer 12) and the second corrosion-preventing layer 22 including the metal halide compound can be formed, for example, by plating-treating a surface of the barrier layer 13. Additionally, the first corrosion-preventing layer 12 (corrosion-preventing layer 12) and the second corrosion-preventing layer 22 including the metal halide compound can be formed by applying a corrosion-prevention treating agent such as an aqueous solution including constituent materials of these corrosion-preventing layers, such as the above-mentioned metal halide compound, on a surface on which these corrosion-preventing layers are formed, drying, and if necessary, curing this.

(Metal Halide Compound)

The above-mentioned metal halide compound is a component which improves chemical resistance such as electrolytic solution resistance. That is, the metal halide compound has the action of passivating a surface of the barrier layer 13, and improving corrosion resistance of the barrier layer 13 to an electrolytic solution.

Additionally, when the first corrosion-preventing layer 12 (corrosion-preventing layer 12) and the second corrosion-preventing layer 22 include the above-mentioned water-soluble resin, the metal halide compound also has the action of crosslinking the water-soluble resin.

In view of miscibility with the above-mentioned water-soluble resin and applying by dispersion in a water-soluble medium, it is preferable that the metal halide compound has water solubility.

Examples of the metal halide compound include chromium halide, iron halide, zirconium halide, titanium halide, hafnium halide, titanium hydrohalide, and salts of these compounds (chromium halide to titanium hydrohalide).

Examples of a halogen atom constituting the metal halide compound include a chlorine atom, a bromine atom, a fluorine atom, and the like, a chlorine atom or a fluorine atom is preferable, and a fluorine atom is more preferable. When a halogen atom constituting the metal halide compound is a fluorine atom, it becomes possible to generate hydrofluoric acid (HF) from the above-mentioned corrosion-prevention treating agent, depending on the conditions.

The metal halide compound may have an atom other than a halogen atom and a metal.

The metal halide compound is preferably chloride or fluoride of iron, chromium, manganese or zirconium.

(Water-Soluble Resin)

Examples of the above-mentioned water-soluble resin which is preferable include a polyvinyl alcohol resin and a derivative thereof, a polyvinyl ether-based resin, and the like.

Examples of the above-mentioned derivative of the polyvinyl alcohol resin include a modified polyvinyl alcohol resin and the like.

The above-mentioned polyvinyl alcohol resin can be produced, for example, by saponifying a polymer or a copolymer of a vinyl ester-based monomer. A polyvinyl alcohol resin used herein may be modified.

Examples of the above-mentioned polymer or copolymer of the vinyl ester-based monomer include homopolymers or copolymers of vinyl ester-based monomers (aliphatic or aromatic vinyl esters) such as fatty acid vinyl esters such as vinyl formate, vinyl acetate, and vinyl butyrate, or aromatic vinyl esters such as vinyl benzoate, and copolymers of the above-mentioned vinyl ester-based monomers and other monomers. The above-mentioned other monomers are not particularly limited, as far as they are copolymerizable with the above-mentioned vinyl ester-based monomers.

Polymerization and copolymerization when producing the above-mentioned vinyl ester-based monomers can be performed by the known method.

(Chelating Agent)

The above-mentioned chelating agent is a component which coordinately binds to a metal ion to form a metal ion complex.

In the present invention, the chelating agent causes a metal compound (for example, chromium oxide or the like) derived from the above-mentioned metal halide compound and the above-mentioned water-soluble resin to bind, to improve the compression strength of the first corrosion-preventing layer 12 (corrosion-preventing layer 12) and the second corrosion-preventing layer 22. For that reason, for example, even when a thickness of the first corrosion-preventing layer 12 (corrosion-preventing layer 12) and the second corrosion-preventing layer 22 exceeds 0.2 µm and is 1.0 µm or less, these corrosion-preventing layers are not embrittled, and therefore, the corrosion-preventing layers do not generate cracking or peeling. That is, by using the chelating agent, the adhesion strength and adherability between the first corrosion-preventing layer 12 (corrosion-preventing layer 12) and the second corrosion-preventing layer 22, and a layer adjacent to these corrosion-preventing layers (for example, barrier layer 13, first adhesive layer 14 (adhesive layer 14), second adhesive layer 24) can be improved.

Additionally, the chelating agent makes a water-soluble resin resistant to water, by chemically reacting with the above-mentioned metal halide compound or water-soluble resin.

Examples of the chelating agent include carboxylic acid-based chelating agents (carboxylic acid compounds) such as an aminocarboxylic acid-based chelating agent and an oxycarboxylic acid-based chelating agent; phosphonic acid-based chelating agents; phosphoric acid-based chelating agents (phosphoric acid and other phosphoric acid compounds) such as a (poly)phosphoric acid-based chelating agent; and the like, and a phosphoric acid-based chelating agent or a phosphonic acid-based chelating agent is preferable.

The chelating agent may be used alone, or two or more kinds of them may be used concurrently, and when two or more kinds of them are used concurrently, a combination and the ratio of them can be arbitrarily selected.

(Crosslinking Compound)

The above-mentioned crosslinking compound is a component which reacts with the above-mentioned water-soluble resin to form a crosslinked structure. By using the crosslinking compound, in the interior of the first corrosion-preventing layer 12 (corrosion-preventing layer 12) and the second corrosion-preventing layer 22, the above-mentioned water-soluble resin and crosslinking compound form a dense crosslinked structure, and passivity and corrosion resistance of a surface of the barrier layer 13 can be improved more.

The crosslinking compound is not particularly limited, as far as it reacts with a hydrophilic group (for example, carboxy group, carboxylic acid group or the like) in the water-soluble resin to form a crosslinked structure, and examples thereof include a compound having an epoxy group, a compound having an oxazoline group, and the like.

A thickness of the first corrosion-preventing layer 12 (corrosion-preventing layer 12) and the second corrosion-preventing layer 22 is not particularly limited, but is preferably 0.05 µm or more, and more preferably 0.08 µm or more. A thickness of the first corrosion-preventing layer 12 (corrosion-preventing layer 12) and the second corrosion-preventing layer 22 is preferably 1.0 µm or less, and more preferably 0.5 µm or less. A preferable range of a thickness of these corrosion-preventing layers can be set by appropriately combining these lower limit values and upper limit values arbitrarily.

[Adhesive Layer]

In the resin coated metal laminate 10, the adhesive layer 14 is a layer for adhering the barrier layer 13 and the substrate layer 15. In the resin coated metal laminates 20 and 30, the second adhesive layer 24 is a layer for adhering the sealant layer 11 and the first corrosion-preventing layer 12. The first adhesive layer 14 is a layer for adhering the second corrosion-preventing layer 22 and the substrate layer 15 in the resin coated metal laminate 20, and is a layer for adhering the second corrosion-preventing layer 22 and the colored layer 16 in the resin coated metal laminate 30.

It is preferable that the first adhesive layer 14 (adhesive layer 14) and the second adhesive layer 24 include the following adhesive (i), adhesive (ii) or adhesive and it is more preferable that the layers consist of the following adhesive (i), adhesive (ii) or adhesive (iii).

For example, as the resin coated metal laminates 10, 20, 30, resin coated metal laminates provided with an adhesive layer on one surface of the substrate layer 15, in which this adhesive layer is formed using the following adhesive (i), adhesive (ii) or adhesive (iii), are preferable.

Additionally, as each component constituting the following adhesive (i) and adhesive (ii), for either component, only one kind, or two or more kinds may be used.

Adhesive (i): Urethane-based adhesive.

Adhesive (ii): Adhesive including a mixture of a polyolefin-based resin as a base resin and isocyanate as a curing agent.

Adhesive Adhesive including a mixture of a polyolefin-based resin as a base resin and an epoxy-based resin as a curing agent.

The first adhesive layer 14 (adhesive layer 14) and the second adhesive layer 24 can be formed by applying the above-mentioned adhesive alone or as a composition with other components blended therein (adhesive composition) on a surface on which these adhesive layers are formed, and drying this, as necessary.

From the viewpoint that workability becomes better, it is preferable that the first adhesive layer 14 (adhesive layer 14), which adheres the substrate layer 15 or the colored layer 16, and the barrier layer 13 or the second corrosion-preventing layer 22 which is provided on the barrier layer 13, is formed using the above-mentioned adhesive (i).

Additionally, it is preferable that the second adhesive layer 24, which adheres the sealant layer 11, and the barrier layer 13 or the first corrosion-preventing layer 12 which is provided on the barrier layer 13, is formed using the above-mentioned adhesive (ii) or adhesive (iii) from the viewpoint that adhesiveness becomes better, and it is preferable that it is formed using the above-mentioned adhesive (iii) from the viewpoint that adhesiveness and durability become better.

Examples of the above-mentioned adhesive (ii) include an adhesive including an acid-modified polyolefin resin (A) as the above-mentioned polyolefin-based resin, and an adhesive including an acid-modified polyolefin resin (A) and a compound (B) having a plurality of epoxy groups in one molecule is preferable.

Such an adhesive (ii) and an adhesive layer which was formed by using this will be illustrated below.

In addition, in the present specification, the "acid-modified polyolefin resin (A)" may be referred to as "(A) component", and the "compound (B) having a plurality of epoxy groups in one molecule" may be referred to as "(B) component".

The first adhesive layer 14 (adhesive layer 14) and the second adhesive layer 24 can be formed, for example, using a liquid adhesive or a non-liquid adhesive including components for forming these adhesive layers (hereinafter, these may be comprehensively referred to as merely "adhesive") such as the (A) component.

The first adhesive layer 14 (adhesive layer 14) and the second adhesive layer 24 can be formed, for example, by molding a melt obtained by melting the (A) component, or a kneading product obtained by melting and kneading the (A) component and the (B) component, as a non-liquid adhesive not including an organic solvent, by extrusion molding or the like. The adhesive layer which was formed by such a method is suitable for performing heat lamination or the like.

Additionally, the first adhesive layer 14 (adhesive layer 14) and the second adhesive layer 24 can be formed, for example, by applying a liquid adhesive including the (A) component and an organic solvent, or a liquid adhesive including the (A) component, the (B) component, and an organic solvent (for example, an adhesive for dry lamination described later) on a surface on which these adhesive layers are formed, and drying this. By adopting a method of applying a liquid adhesive like this, the whole resin coated metal laminates 10, 20, 30 can be made thinner.

(Acid-Modified Polyolefin Resin (A))

The acid-modified polyolefin resin (A) ((A) component) is a polyolefin-based resin modified with unsaturated carboxylic acid or a derivative thereof, and has an acid functional group such as a carboxy group and a carboxylic anhydride group (group represented by the formula "—C(=O)—O—C(=O)—") in the polyolefin-based resin.

The (A) component is obtained by modification of the polyolefin-based resin with unsaturated carboxylic acid or a derivative thereof, copolymerization of an acid functional group-containing monomer and olefins, or the like.

Among them, it is preferable that the (A) component is a component obtained by modifying the polyolefin-based resin with an acid.

Examples of the above-mentioned polyolefin-based resin include polyethylene, polypropylene, poly-1-butene, polyisobutylene, a copolymer of propylene and ethylene, a copolymer of propylene and an olefin-based monomer, and the like.

Examples of the above-mentioned olefin-based monomer to be copolymerized with propylene include 1-butene, isobutylene, 1-hexene, and the like.

In terms of adhesiveness, durability, and the like, it is preferable that the (A) component is maleic anhydride-modified polypropylene.

(Compound (B) Having a Plurality of Epoxy Groups in One Molecule)

The compound (B) having a plurality of epoxy groups in one molecule ((B) component) is a component to be used concurrently with the (A) component, and is an arbitrary component.

The (B) component is not particularly limited as far as it has a plurality of epoxy groups in one molecule, but the component may be any of a low-molecular compound and a high-molecular compound. Among them, in terms of good miscibility and compatibility with the (A) component, it is preferable that the (B) component is a high-molecular compound (resin). On the other hand, when a liquid adhesive (for example, adhesive for dry lamination described later) is used as the adhesive, in terms of good solubility in an organic solvent, the (B) component is preferably a low-molecular compound.

Examples of the (B) component include a phenoxy resin which is synthesized from bisphenols and epichlorohydrin; a phenol novolak-type epoxy resin; a bisphenol-type epoxy resin; and the like.

Among them, from the viewpoint that the content of an epoxy group per one molecule is high, and a particularly dense crosslinked structure can be formed together with the (A) component, the (B) component is preferably a phenol novolak-type epoxy resin.

In the resin coated metal laminate 20 or 30, when the adhesive (ii) including the (B) component is used in formation of the second adhesive layer 24, it is presumed that both of the above-mentioned acid functional group of the (A) component and an epoxy group of the (B) component function as an adhering functional group to an adherend (particularly, functional group such as a carboxy group possessed by the first corrosion-preventing layer 12) of the second adhesive layer 24. Thereby, it is presumed that the second adhesive layer 24 exhibits excellent adhesiveness to the first corrosion-preventing layer 12 and the sealant layer 11.

Additionally, it is presumed that when the (B) component is used, by reacting a part of the above-mentioned acid functional group of the (A) component and a part of an epoxy group of the (B) component to form a crosslinked structure of the (A) component and the (B) component, the strength of the first adhesive layer 14 (adhesive layer 14) and the second adhesive layer 24 is improved, and these adhesive layers become to be excellent in both adhesiveness and durability.

In the above-mentioned adhesive such as the adhesive (ii), the content of the (B) component is preferably 1 to 30 parts by mass, more preferably 3 to 20 parts by mass, and particularly preferably 5 to 15 parts by mass, based on 100 parts by mass of the content of the (A) component.

(Organic Solvent)

The above-mentioned organic solvent can be used for preparing an adhesive for dry lamination, which is a liquid adhesive.

The above-mentioned organic solvent is not particularly limited, but an organic solvent which can dissolve components included in the liquid adhesive such as the (A) component to prepare a uniform solution is preferable. Examples of such an organic solvent include the known organic solvents which are used in a solution-type adhesive.

A thickness of the first adhesive layer 14 (adhesive layer 14) and the second adhesive layer 24 is not particularly limited, but is preferably 0.1 to 5 μm, and more preferably 0.5 to 3 μm. By having a thickness of these adhesive layers in such a range, a subject can be adhered with a high adhering force.

[Substrate Layer]

The substrate layer 15 is a layer which improves the strength and moldability of the resin coated metal laminates 10, 20, 30, and can also be a layer which improves the design property, depending on a configuration thereof.

The substrate layer 15 includes a polyamide as a main component, and is composed of a polyamide, or includes a polyamide and other components.

The above-mentioned other components included by the substrate layer 15 are not particularly limited, but can be appropriately selected depending on the purpose, and preferable examples thereof include a coloring agent such as a pigment and a dye; and the like.

As is also apparent from the content of a polyamide in the above-mentioned substrate layer 15, the content of other components of the substrate layer 15 is preferably 5% by mass or less, more preferably 3% by mass or less, and particularly preferably 1% by mass or less.

The substrate layer 15 including the above-mentioned other components may have properties derived from inclusion of a polyamide, to the same extent as that of the case of the substrate layer 15 which does not include other components, and includes a polyamide.

From such a view point, the content of a polyamide of the substrate layer 15 is preferably 95% by mass or more, more preferably 97% by mass or more, and particularly preferably 99% by mass or more.

Examples of a polyamide constituting the substrate layer 15 include nylon and the like.

A maximum value of the tensile strength in a tensile test of the substrate layer 15 is 25 N/mm or more, and for example, it may be 25 N/mm or more in at least one of a MD direction (length direction) and a TD direction (width direction), and is preferably 25 N/mm or more in both of the MD direction and the TD direction.

By using the substrate layer 15 in which a maximum value of the above-mentioned tensile strength is 25 N/mm or more, even when the resin coated metal laminates 10, 20, 30 are used by folding so that a surface on a side opposite to a side of the substrate layer 15 on which the sealant layer 11 is provided becomes convex, damage of the substrate layer 15 at this convex site is suppressed.

The above-mentioned tensile strength of the substrate layer 15 can be attained by regulating a kind and a combination of monomer components constituting a polyamide, as well as a molecular weight of a polyamide and the like, and can also be attained by regulating the stretching ratio in stretching treatment at the time of manufacturing of a polyamide.

The substrate layer 15 may be composed of one layer (monolayer), or may be composed of a plurality of layers of two or more layers. When the substrate layer 15 is composed of a plurality of layers, these plural layers may be the same or different, and a combination of these plural layers is not particularly limited, as far as the effect of the present invention is not deteriorated.

However, it is preferable that, in the resin coated metal laminates 10, 20, 30, the substrate layer 15 is composed of one layer (monolayer).

A thickness of the substrate layer 15 may be thinner than a thickness of the barrier layer 13, and is preferably less than 50 μm. By having a thickness of the substrate layer 15 in such a range, in the resin coated metal laminates 10, 20, 30, generation of curling is suppressed, and at the same time, folding is easy, and when folded so that a surface on a side opposite to a side of the substrate layer 15 on which the sealant layer 11 is provided becomes convex, damage of the substrate layer 15 is suppressed. When a thickness of the substrate layer 15 is too thin, rubbing resistance, conveyance property at the time of manufacturing, and working suitability are inferior.

A thickness of the substrate layer 15 is preferably 30 μm or less, for example, can be any of 25 μm or less, 20 μm or less, 15 μm or less, 10 μm or less, and the like, but these are an example. By having a thickness of the substrate layer 15 of the above-mentioned upper limit value or less, folding of the resin coated metal laminates 10, 20, 30 becomes easier, and a package or a wrapper can be more easily constituted using the resin coated metal laminates 10, 20, 30.

A thickness of the substrate layer 15 is preferably 2 μm or more, and more preferably 4 μm or more. By having a thickness of the substrate layer 15 of the above-mentioned lower limit value or more, the mechanical strength of the substrate layer 15 is improved more, and the effect of suppressing damage of the substrate layer 15 when the resin coated metal laminate 10 is folded so that a surface on a side opposite to a side of the substrate layer 15 on which the sealant layer 11 is provided becomes convex, becomes higher.

A preferable range of a thickness of the substrate layer 15 can be set by appropriately combining the above-mentioned upper limit values and lower limit values arbitrarily.

The substrate layer 15 may include fine particles as an additive, and the above-mentioned fine particles may be any of organic fine particles and inorganic fine particles. Additionally, the above-mentioned fine particles may be colored fine particles, and examples of a constituent material of the colored fine particles include carbon black, carbon nanofiber, titanium oxide, and the like.

In the substrate layer 15, it is preferable that the content of the above-mentioned fine particles is 0.5 to 10 parts by mass based on 100 parts by mass of the content of resin components.

In the resin coated metal laminate 10, a thickness of the substrate layer 15 and a thickness of the barrier layer 13 are both preferably in the above-mentioned preferable numerical value range, and for example, it is preferable that the thickness of the substrate layer 15 is 15 μm or less, and the thickness of the barrier layer 13 is 50 μm or less.

[Colored Layer]

The colored layer 16 is a layer for regulating a color tone when the resin coated metal laminate 30 is viewed from a surface side (surface protective layer 18 side), in order to improve the design property of the resin coated metal laminate 30.

A kind of a colored layer-forming agent for forming the colored layer 16 and a method of forming the colored layer 16 are not particularly limited, and the colored layer 16 can be formed using a colored layer-forming agent as a commercial product containing a pigment or a dye, by a known method using a coating device such as a bar coater.

It is preferable that the colored layer 16 includes colored fine particles or a pigment. Examples of the colored fine particles include carbon black, carbon nanofiber, titanium oxide, and the like.

[Mat Layer]

The mat layer 17 is a layer for imparting the matting property to the resin coated metal laminate 30. In the resin coated metal laminate 30 in which the mat layer 17 is laminated on the substrate layer 15, lusterless appearance is obtained, and a scratch or the like of a surface becomes more difficult to be seen than in the case of the resin coated metal laminate having the further higher degree of luster.

In terms of simple acquisition of the good matting property, it is preferable that the mat layer 17 contains fine particles. By inclusion of fine particles by the mat layer 17, fine irregularities are formed on a surface of the mat layer 17, and by scattering of light by the irregularities, the degree of luster is reduced, and the matting effect is obtained.

The mat layer 17 is preferably a layer in which fine particles are dispersed in a resin which is to be a base resin, and such a mat layer 17 can be formed, for example, by applying a mat layer-forming agent in which the above-mentioned resin and fine particles are dispersed in a solvent (dispersion medium), on a surface on which the mat layer 17 is formed, and drying this.

Examples of the above-mentioned resin contained in the mat layer 17 include an acrylic resin, a urethane resin, an acrylic urethane resin, polyvinylidene chloride, a vinylidene chloride-vinyl chloride copolymer resin, a maleic anhydride-modified polypropylene resin, a polyester resin, an epoxy resin, a phenol resin, a phenoxy resin, a fluorine resin, a cellulose ester resin, a cellulose ether resin, a polyamide, a polyphenylene ether resin (PPE), a polyphenylene sulfide resin (PPS), a polyaryl ether resin (PAE), a polyether ether ketone resin (PEEK), and the like.

The above-mentioned resins may be used alone, or two or more kinds may be used concurrently, and when two or more kinds are used concurrently, a combination and the ratio of them can be selected arbitrarily.

It is preferable that the above-mentioned resin is an acrylic urethane resin.

The above-mentioned fine particles contained in the mat layer 17 may be any of organic fine particles and inorganic fine particles.

Examples of the above-mentioned fine particles include organic fine particles including polystyrene, polycarbonate, polyvinyl chloride, polyvinyl alcohol, polyacrylonitrile, an epoxy resin, an acrylic resin, a methacrylic resin, a silicone resin, a urethane resin or the like; inorganic fine particles including silica, alumina, zirconia, zinc oxide, titanium oxide, glass beads or the like; and the like.

The above-mentioned fine particles may be used alone, or two or more kinds may be used concurrently, and when two or more kinds are used, a combination and the ratio of them can be arbitrarily selected.

A shape of the above-mentioned fine particles is preferably nearly spherical, and an average particle diameter in this case is preferably 1 to 10 μm, and more preferably 2 to 5 μm.

The above-mentioned fine particles is preferably one or two or more kinds selected from the group consisting of acrylic resin fine particles (acrylic beads) and silica fine particles, and more preferably a mixture of acrylic resin fine particles and silica fine particles.

A thickness of the mat layer 17 is preferably thin, so that fine irregularities are effectively formed on a surface thereof by the above-mentioned fine particles. Such a thin mat layer 17 can be formed, for example, by applying the mat layer-forming agent on a surface on which the mat layer 17 is formed, by the known method using a coating device such as a bar coater and a gravure coater, or a printing machine.

A thickness of the mat layer 17 is preferably 0.1 μm to 1 mm, and more preferably 0.5 μm to 100 μm.

Provided that a thickness of the mat layer 17 mentioned herein is merely an example.

[Surface Protective Layer]

The surface protective layer 18 is a layer for printing a pattern or a letter or the like on a surface thereof with good property. When the surface protective layer 18 causing the effect of irregularities formed on a surface of the mat layer 17 to disappear, since the matting property of the resin coated metal laminate 30 can be excessively lost, there is a possibility that both the matting property and the printing property cannot be attained. For that reason, the surface protective layer 18 does not refill irregularities formed on a surface of the mat layer 17, or does not cover irregularities, to make flat a surface of the resin coated metal laminate 30, and it is preferable that it improves the printing property due to the surface property of the surface protective layer 18.

Additionally, the resin coated metal laminate 30 in which the surface protective layer 18 is laminated on the mat layer 17 becomes more excellent in the effect of the present invention that rubbing resistance in a rubbing test described later is improved due to the presence of the mat layer 17. The reason thereof is presumed to be due to that a force which is applied when a surface of the resin coated metal laminate 30 is rubbed is dispersed due to irregularities on a surface of the mat layer 17.

Examples of the surface protective layer 18 having the above-mentioned surface property include a surface protective layer in which a contact angle of a surface to methyl ethyl ketone (hereinafter, may be referred to as "MEK") is preferably 10° to 50°, more preferably 10° to 40°, further preferably 10° to 30°, particularly preferably 10° to 20°, and most preferably 12° to 17°.

By having the above-mentioned contact angle of the above-mentioned lower limit value or more, wettability to MEK or other solvents can be moderately reduced, and when printing is performed on the surface protective layer 18 using a solvent-type ink, excessive spreading of ink wetting or generation of bleeding on the surface protective layer 18 can be suppressed. On the other hand, by having the above-mentioned contact angle of the above-mentioned upper limit value or less, deterioration of other properties other than the printing property of the surface protective layer 18 can be suppressed more. Examples of the above-mentioned other properties include adhesiveness when the resin coated metal laminate 30 is adhered to electronic equipment or the like using an adhesive or a pressure-sensitive adhesive, on the surface protective layer 18, and the like.

A surface protecting agent containing materials for forming the surface protective layer 18 is not particularly limited, as far as it can form a layer which has good printing property, and does not excessively lose the matting property, as the surface protective layer 18.

Examples of the above-mentioned forming material include various treating agents which are commercially available as a peeling agent, a surfactant, a releasing agent or the like.

Examples of the above-mentioned forming material include more specifically a non-silicone-based peeling agent (releasing agent) such as a polymer of a long chain alkyl group-containing vinyl monomer and a polymer of a fluorinated alkyl vinyl monomer; a surfactant such as a fluorinated surfactant; and the like.

It is preferable that the surface protective layer 18 is formed so as to maintain irregularities, without excessively or completely burying irregularities formed on a surface of the mat layer 17, as described above. Such a surface protective layer 18 can be formed, for example, by applying the surface protecting agent on the mat layer 17, by the known method using a coating device such as a bar coater, and drying.

An amount to be applied of the above-mentioned surface protecting agent is not particularly limited, and it is preferable that the amount is appropriately regulated depending on an extent of irregularities formed on a surface of the mat layer 17, for example, a size (for example, average particle diameter) and a use amount of the above-mentioned fine particles contained in the mat layer 17, as well as a thickness of the mat layer 17 or the like.

When the surface protecting agent is applied using a bar coater, an amount to be applied of the surface protecting agent is preferably 1 to 10 $g/m^2$. A thickness of the surface protective layer 18 which was formed by this method is, for example, preferably 0.1 µm or less, more preferably 0.01 µm or less, further preferably 0.0001 to 0.01 µm, and particularly preferably 0.0005 to 0.005 µm.

An amount to be applied of the surface protecting agent and a thickness of the surface protective layer 18 mentioned herein are merely an example.

<Method of Manufacturing Resin Coated Metal Laminate>

The resin coated metal laminate of the present invention can be manufactured by laminating the above-mentioned respective layers constituting this so that they are arranged at objective positions.

For example, the resin coated metal laminate 30 shown in FIG. 3 can be manufactured by the following method.

First, the mat layer 17 is formed on one surface of the substrate layer 15 using the mat layer-forming agent as illustrated above. A temperature for drying the mat layer-forming agent is not particularly limited, may be appropriately regulated depending on heat resistance of the substrate layer 15, and is, usually, preferably 70 to 80° C. The mat layer 17 after formation may be aged at preferably 38 to 60° C., more preferably for 3 hours to 5 days in advance before a next step.

Then, the other surface of the substrate layer 15, that is, a surface on a side opposite to a surface on which the mat layer 17 was formed, is dried using an oven or the like as necessary, employing the colored layer-forming agent as illustrated above, to form the colored layer 16.

In addition, herein, the case where the colored layer 16 is formed after the mat layer 17 is formed was illustrated, but the mat layer 17 may be formed after the colored layer 16 is formed.

Then, the surface protective layer 18 is formed on a surface of the formed mat layer 17 (exposed surface) using the surface protecting agent, as illustrated above. The surface protective layer 18 after formation may be aged or may not be aged in advance before a next step, like the case of the mat layer 17.

From the above, a first intermediate laminate in which the colored layer 16, the substrate layer 15, the mat layer 17, and the surface protective layer 18 are laminated in this order in a thickness direction thereof is obtained.

The resulting first intermediate laminate may be cut into a prescribed width.

Meanwhile, the first corrosion-preventing layer 12 is formed on one surface of the barrier layer 13 using the corrosion-prevention treating agent, as illustrated above.

Then, the second corrosion-preventing layer 22 is formed on the other surface of the barrier layer 13, that is, on a surface on a side opposite to a surface on which the first corrosion-preventing layer 12 was formed, using the same corrosion-prevention treating agent as that of the case of the first corrosion-preventing layer 12. In addition, the first corrosion-preventing layer 12 and the second corrosion-preventing layer 22 may be formed at the same time.

In addition, herein, the case where the corrosion-prevention treating agent was used was illustrated, but the first corrosion-preventing layer 12 and the second corrosion-preventing layer 22 may be formed by plating-treating a surface of the barrier layer 13.

Then, the second adhesive layer 24 is formed on a surface of the first corrosion-preventing layer 12 (exposed surface) using the adhesive or the adhesive composition, as illustrated above.

When a kneading product obtained by melting and kneading the (A) component and the (B) component is used as a non-liquid adhesive not including an organic solvent as illustrated above, melting and kneading of the (A) component and the (B) component can be performed, for example, using the known device such as a single screw extruder, a multi-screw extruder, a Banbury mixer, a plastomill, and a heat roll kneader. It is preferable that in order to suppress degradation of an epoxy group at the time of melting and kneading, volatile components reacting with an epoxy group such as the moisture is removed to the outside of the device in advance, and when volatile components are generated during a reaction, the volatile components are discharged to the outside of the device at any time by degasification or the like. The (A) component having a carboxylic anhydride group as an acid functional group is preferable in terms that reactivity with an epoxy group of the (B) component is high, and a reaction becomes possible under the milder condition. A temperature at the time of melting and kneading is preferably 240 to 300° C. in terms that the (A) component and the (B) component are sufficiently melted, and are not thermally degraded. In addition, a temperature at the time of melting and kneading can be measured by a method of contacting a thermocouple with an adhesive in the melted state, immediately after extrusion from the melting and kneading device, or the like.

Additionally, when the liquid adhesive (for example, an adhesive for dry lamination) including the (A) component, the (B) component, and an organic solvent illustrated above is used, the above-mentioned liquid adhesive can be prepared by dissolving the (A) component and the (B) component in an organic solvent.

Then, the second adhesive layer 24 and the sealant layer 11 are laminated. In this case, for example, a film for constituting the sealant layer 11 is arranged on a surface on a side opposite to a side of the second adhesive layer 24 on which the first corrosion-preventing layer 12 is provided (exposed surface), and lamination may be performed in this state.

Lamination may be any of dry lamination and thermal lamination.

A temperature and a pressure at the time of lamination are not particularly limited as far as the sealant layer 11 is adhered well with the first corrosion-preventing layer 12 and the barrier layer 13 via the second adhesive layer 24, and for example, they can be determined in view of a material, a melting point, and the like of an adhesive constituting the second adhesive layer 24.

In terms that a temperature at the time of lamination can be considerably lowered, it is preferable that lamination between the second adhesive layer 24 and the sealant layer 11 is dry lamination.

A temperature at the time of dry lamination is usually 70 to 150° C., and preferably 80 to 120° C.

A pressure at the time of dry lamination is preferably 0.1 to 0.5 MPa.

Generally, when metal foil which has low heat conductivity and is hardly expanded is heated at a high temperature, distortion (curling) is easily generated in a width direction of the metal foil. When thermal lamination is performed using such metal foil (barrier layer 13), heat may not be sufficiently transmitted in a plane of the metal foil, and in the metal foil, a part not contacted with a thermal pressing roller in a thickness direction thereof may be generated, the metal foil may not be contacted with a roll, and folding or wrinkles may be generated due to distortion itself at the time of heat pressing. Meanwhile, when the metal foil is heated to a high temperature to such an extent that distortion is not generated, the production efficiency is reduced due to reduction in a working speed and increase in the necessary heat quantity. In contrast, by lowering a temperature at the time of lamination, generation of a disadvantage in the barrier layer 13 as described above can be avoided, and furthermore, it becomes possible to prevent whitening and the like due to heat of the sealant layer 11, and deterioration of the sealant layer 11 can be suppressed, and therefore, it becomes possible to expand the range of choice of the sealant layer 11.

Therefore, by dry laminating the second adhesive layer 24 and the sealant layer 11, folding and wrinkles of the barrier layer 13, as well as whitening and the like of the sealant layer 11 due to heat can be suppressed, and the resin coated metal laminate 30 which is suitable can be manufactured at the high production efficiency.

In addition, when the above-mentioned adhesive for dry lamination is used at the time of formation of the second adhesive layer 24, unlike the above-illustrated method, formation of the second adhesive layer 24 and lamination of the sealant layer 11 may be performed as a series of steps, using the known (dry) lamination device.

From the above, a second intermediate laminate in which the sealant layer 11, the second adhesive layer 24, the first corrosion-preventing layer 12, the barrier layer 13, and the second corrosion-preventing layer 22 are laminated in this order in a thickness direction thereof is obtained.

The resulting second intermediate laminate may be cut into a prescribed width.

Then, the first adhesive layer 14 is formed on a surface of the second corrosion-preventing layer 22 (exposed surface) in the resulting second intermediate laminate, using the adhesive or the adhesive composition as illustrated above.

The first intermediate laminate is arranged on the first adhesive layer 14 so that the colored layer 16 of the first intermediate laminate is opposed to the first adhesive layer 14, and the first intermediate laminate and the second intermediate laminate are laminated by dry lamination or the like with the first adhesive layer 14 interposed between the first intermediate laminate and the second intermediate laminates. The resulting lamination product may be aged as necessary.

In addition, when the above-mentioned adhesive for dry lamination is used at the time of formation of the first adhesive layer 14, formation of the first adhesive layer 14 and lamination of the first intermediate laminate and the second intermediate laminate may be performed as a series of steps, using the known (dry) lamination device, like the case of the second adhesive layer 24 as described above.

From the above, the resin coated metal laminate 30 shown in FIG. 3 is obtained.

In addition, the above-mentioned manufacturing method is an example, the method of manufacturing the resin coated metal laminate 30 is not limited to this, and the laminate can also be manufactured by other manufacturing method in which a subject of lamination of each layer and formation order are changed.

Additionally, herein, the method of manufacturing the resin coated metal laminate 30 was illustrated, but for example, the resin coated metal laminates of other embodiments of the present invention including the resin coated metal laminate 10 shown in FIG. 1 and the resin coated metal laminate 20 shown in FIG. 2 can also be manufactured by appropriately regulating the manufacturing method, depending on features of an objective resin coated metal laminate, such as omission of formation of an unnecessary layer, and change in subjects on which a part of layers are formed, in the above-mentioned manufacturing method.

Figure 4:
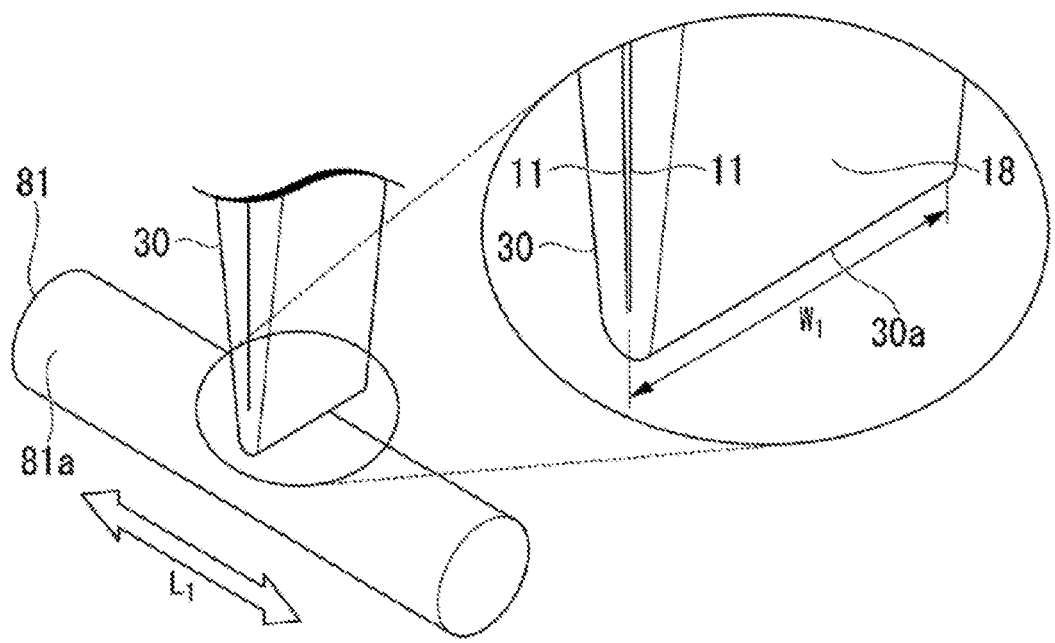
FIG. 4 is a schematic view for illustrating a rubbing test of a test piece of a resin coated metal laminate.

A rubbing test of a test piece of the resin coated metal laminate can be performed as follows. FIG. 4 is a schematic view for illustrating a rubbing test of a test piece of the resin coated metal laminate. In addition, herein, the case where the resin coated metal laminate 30 shown in FIG. 3 is used will be illustrated, but the case of other resin coated metal laminates can also be subjected to the rubbing test similarly.

In the above-mentioned rubbing test, first, the resin coated metal laminate 30 is folded into two so that a surface on a side opposite to a side of the substrate layer 15 on which the sealant layer 11 is provided (in other words, a surface on a side of the substrate layer 15, which is contacted with the mat layer 17) becomes convex, to obtain a test piece (hereinafter, like the resin coated metal laminate, a symbol 30 is added). In the test piece 40 which was folded into two, the sealant layer 11 in which surfaces became to be mutually contacted may be heat-sealed. When the resin coated metal laminate in which a layer on an internal side, surfaces of which become to be contacted with each other when a test piece is made by folding into two becomes a heat sealable layer such as the sealant layer is used like this, these sealant layers may be heat-sealed in the test piece.

An outermost surface of a folded site 30a of this test piece 30, which is convex, is arranged contacting with a side surface 81a of a stainless-steel bar 81 having a diameter of 1.5 cm. Herein, the above-mentioned outermost surface is a surface of the surface protective layer 18, which is convex. The side surface 81a of the stainless-steel bar 81 is a curved and smooth surface, and surface roughness Ra thereof is 1 μm or less. A width Wi of the test piece 30 at a site contacting with the above-mentioned side surface 81a is not particularly limited, but is preferably 5.0 to 20.0 cm.

Then, a load of 200 g is applied to the test piece 30, and the test piece 30 is rubbed by reciprocating it specific times on this side surface 81a, while the test piece 30 is pushed against the side surface 81a of the stainless-steel bar 81. A direction of reciprocation at this time is a longitudinal direction (in other words, central axial direction) of the stainless-steel bar 81. Additionally, one way distance $L_1$ of reciprocation each time is made to be the same in all cases, and is 10.0 cm. The necessary time when the piece moves a distance $L_1$, that is, the necessary time for one stroke movement is made to be 1 second.

After the test piece 30 is reciprocated specific times like this, a site of the test piece 30, which was rubbed with the stainless-steel bar 81 (that is, the above-mentioned site 30a which was folded into two) and sites in the vicinity thereof are observed, and the presence or absence of destruction of the substrate layer 15 is confirmed.

In the case where the above-mentioned rubbing test is performed concerning the resin coated metal laminate of the present invention, even when the above-mentioned reciprocation is performed 99 times, exposure of a layer adjacent to the substrate layer (herein, colored layer 16) associated with destruction of the substrate layer is not seen.

<Battery Package and Method of Manufacturing Battery Package>

The battery package of the present invention is a battery package provided with the above-mentioned resin coated metal laminate, and is characterized in that it has an interior space for accommodating the battery, and a sealant layer side of the above-mentioned resin coated metal laminate becomes a side of the above-mentioned interior space.

The battery package of the present invention can be manufactured, for example, by molding the resin coated metal laminate into an objective shape so that the sealant layer of the above-mentioned resin coated metal laminate finally faces an interior space of the battery package (faces towards an interior space side), and tightly sealing (sealing) an end as necessary.

A shape and a size of the battery package are not particularly limited, and can be appropriately regulated depending on a kind of the battery to be accommodated.

The battery package may be composed of one member, or may be configured by combining two or more members (for example, container body and lid part), as described later.

<Battery and Method of Manufacturing Battery>

The battery of the present invention is characterized in that it is provided with the above-mentioned battery package.

Examples of the above-mentioned battery include batteries utilizing an electrolytic solution which was prepared using an organic electrolyte such as secondary batteries such as a lithium ion battery; capacitors such as an electric double layer capacitor; and the like. Since the above-mentioned resin coated metal laminate of the present invention has good chemical solution resistance (electrolytic solution resistance), even when an electrolytic solution containing LiPFe or the like is used, the battery of the present invention can be suitably operated.

Figure 5:
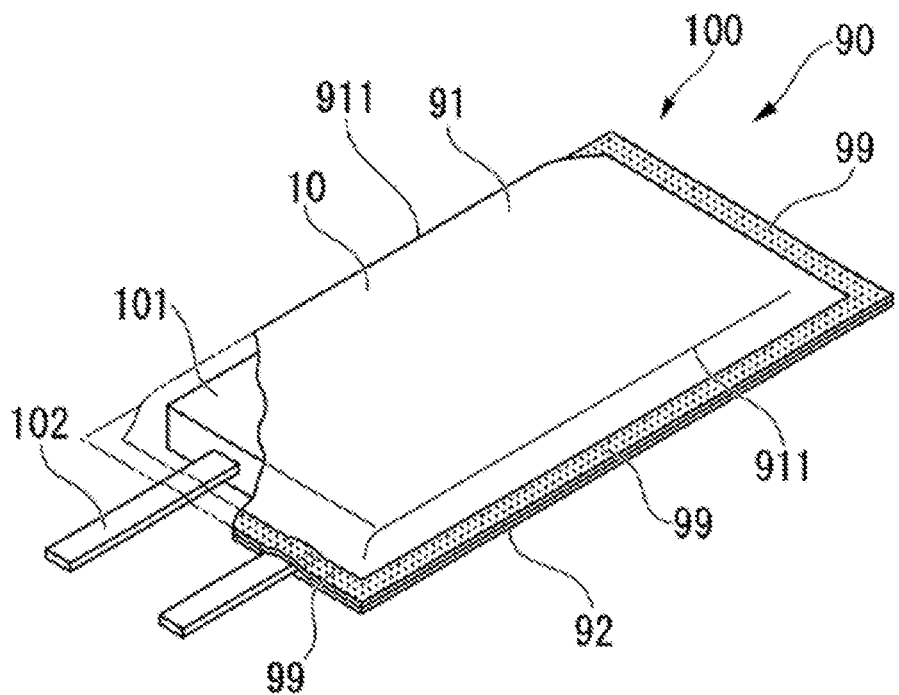
FIG. 5 is a perspective view schematically showing one embodiment of a battery of the present invention.

FIG. 5 is a perspective view schematically showing one embodiment of the battery of the present invention.

A secondary battery 100 shown herein is such that a lithium ion battery 101 as a battery body is included in a battery packaging container 90.

The battery packaging container 90 which is the battery package is constituted by overlapping a container body 91 including the above-mentioned resin coated metal laminate 10 of the present invention and a lid part 92 including the resin coated metal laminate 10, and sealing a peripheral part 99 of the overlapped one. A symbol 102 indicates an electrode lead which is connected to a positive electrode and a negative electrode of a lithium ion battery 101.

In the battery packaging container 90, the container body 91 has a concave part for accommodating the lithium ion battery 101. By having this concave part, in the container body 91, a convex site 911 which is folded so that a surface on a side opposite to a side of the substrate layer 15 on which the sealant layer 11 is provided becomes convex exists in the resin coated metal laminate 10. When the barrier layer 13 includes stainless steel, since a folded site of the barrier layer 13 easily forms a sharp shape, in such a convex site 911, usually, damage such as a break, a tear, and a cut is easily generated at the substrate layer 15. However, in the battery packaging container 90 (container body 91), by formation using the resin coated metal laminate 10, damage of the substrate layer 15 is suppressed at the convex site 911, and for example, exposure of a layer which is on a more sealant layer 11 side (interior space side) than the substrate layer 15, such as the barrier layer 13, is suppressed. As a result, even when liquid exists in an interior space accommodating the lithium ion battery 101, leakage of this liquid to the outside of the battery packaging container 90 is suppressed.

In addition, herein, an example of the battery which includes the battery body in the battery packaging container was illustrated, but the above-mentioned effect of the present invention is also manifested in the batteries in which a part other than the battery body is packaged or wrapped with a package or a wrapper.

Thus far, as the secondary battery, a secondary battery which is configured by overlapping the container body and the lid part, and sealing all peripheral parts of this overlapped one was illustrated, but as another embodiment of the battery of the present invention, an embodiment in which a peripheral part of one side is formed via folding working can also be exemplified.

Figure 6A:
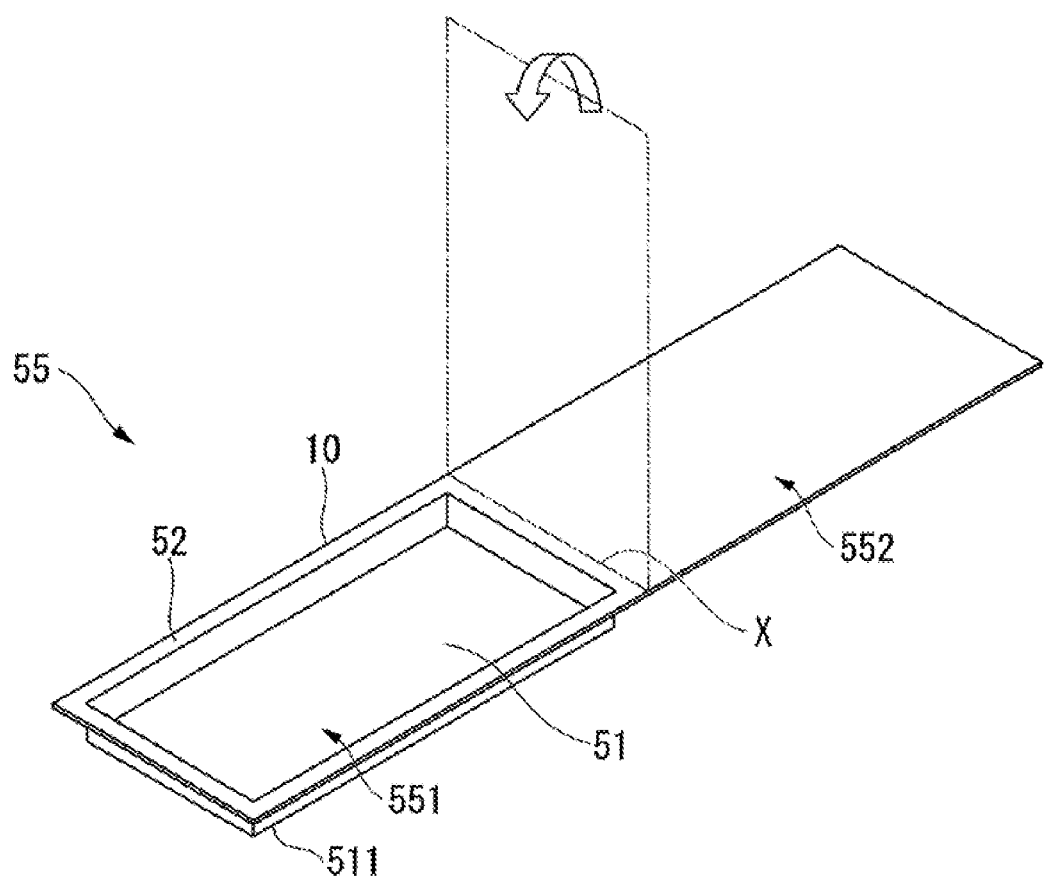
FIGS. 6A and 6B are perspective views for schematically illustrating another embodiment of a battery of the present invention and one example of a method of manufacturing it.
Figure 6B:
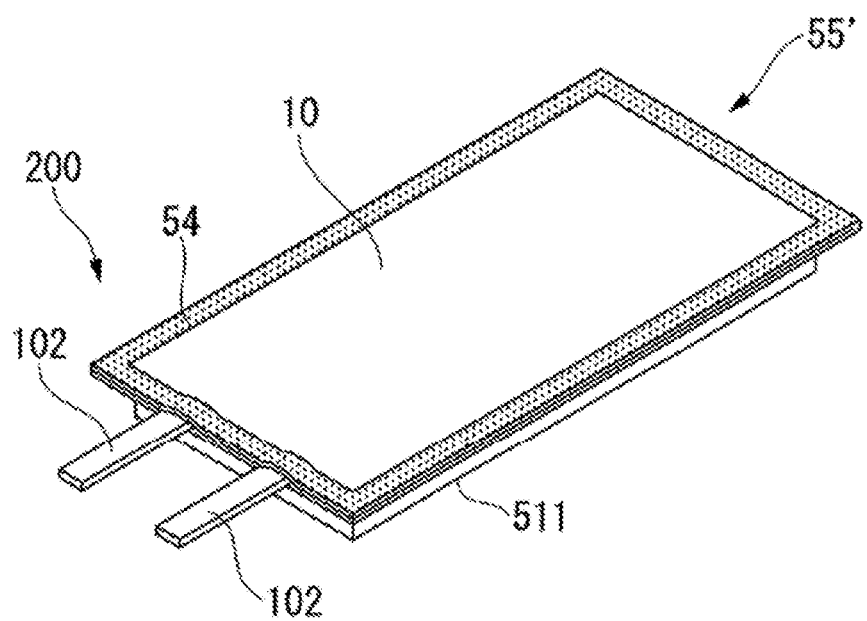

FIGS. 6A and 6B are perspective views schematically showing another embodiment of the battery of the present invention and one example of a method of manufacturing it.

A secondary battery 200 can be manufactured by a method shown below.

First, as shown in FIG. 6A, in a rectangular resin coated metal laminate 10, a part on one end side in a longitudinal direction is molded by pressing it from a side of the resin coated metal laminate 10 on which the sealant layer 11 is provided, by drawing molding or the like, to obtain a molded body 55 having a concave part 51. A depth of the concave part 51 can be, for example, 2 mm or more.

Then, a lithium ion battery is accommodated in the concave part 51 of the molded body 55 (not shown).

Then, at a part on another end side in a longitudinal direction, of the molded body 55 on which the concave part 51 is not formed, the molded body 55 is folded to a substrate layer 15 side, so that a folding line X extending in a short direction of the molded body 55 is formed. In the figure, this folding direction is shown with an arrow. Thereby, the molded body 55 (resin coated metal laminate 10) is brought into the folded state so that a surface on a side opposite to a side of the substrate layer 15 on which the sealant layer 11 is provided becomes convex. Hereinafter, in the present specification, a region on a side provided with the concave part 51 with respect to the folding line X, in the molded body 55, is referred to as "first region 551", and a region on a side opposite to a side provided with the concave part 51 with respect to the folding line X is referred to as "second region 552".

Figure 7A:
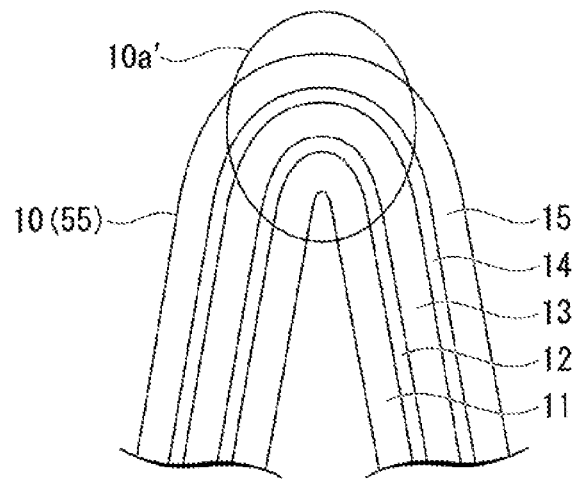
FIGS. 7A and 7B are sectional views schematically showing a resin coated metal laminate of the present invention at the time of folding working.
Figure 7B:
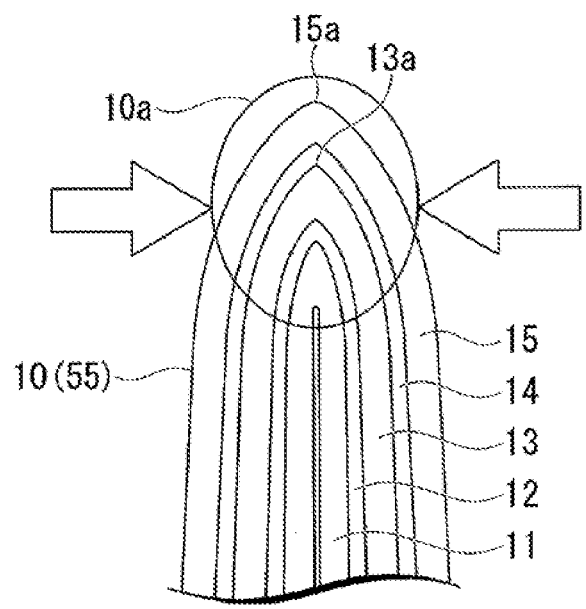

FIGS. 7A and 7B are sectional views schematically showing the molded body 55 (resin coated metal laminate 10) at the time of this folding working.

At the time of folding working, as shown in FIG. 7A, the resin coated metal laminate 10 is folded so that the sealant layer 11 is located inside. At that time, at a folded site 10a', a surface on a side opposite to a side of the substrate layer 15 on the sealant layer 11 is provided becomes convex.

Then, as shown in FIG. 7B, the resin coated metal laminate 10 is completely folded into two, until the sealant layers 11 which became opposed by folding are contacted. Thereby, a tip part of the folded site 10a' becomes to have a sharper shape, becoming a sharp twofold site 10a. At this twofold site 10a, a twofold site 13a of the barrier layer 13 including stainless steel easily becomes to have a sharp shape, as shown herein. An elongation stress in a folded direction is applied to a twofold site 15a of the substrate layer 15 positioned outside the barrier layer 13. Furthermore, a rubbing force is applied to the twofold site 15a of the substrate layer 15, as shown with an arrow in FIG. 7B, and the two-folded state is maintained. Therefore, it follows that, in this state, the above-mentioned elongation stress and rubbing force are applied to the twofold site 15a of the substrate layer 15, while undergoing influence of the twofold site 13a of the barrier layer 13 having a sharp shape. In the previous resin coated metal laminates, in such a case, damage such as a break, a tear, and a cut is generated at the substrate layer, but in the resin coated metal laminate 10 of the present invention, such damage is suppressed.

Additionally, in the molded body 55, a convex site 511 having the same shape as that of the convex site 911 in the container body 91 shown in FIG. 5 exists. However, by using the resin coated metal laminate 10 of the present invention, also at this convex site 511, damage such as a break, a tear, and a cut of the substrate layer 15 is suppressed.

In addition, a process leading to damage of the substrate layer and its suppressing effect can be most easily understood from the state shown in FIGS. 7A and 7B, but in the convex site 511 shown in FIG. 6A and the convex site 911 shown in FIG. 5, it can also be understood that the effect of suppressing damage of the substrate layer is obtained similarly, although the magnitude of a folding angle of the resin coated metal laminate 10 is different.

As described above, after folding of the molded body 55, the sealant layer 11 positioned at a periphery 52 of the concave part 51 in the first region 551 and the sealant layer 11 at a position overlapping with the periphery 52 in the second region 552 (that is, peripheral part 54) are overlapped. Thereby, the second region 552 is overlapped on the concave part 51 of the first region 551.

Then, as shown in FIG. 6B, by heat-sealing the sealant layer 11 positioned at the periphery 52 of the concave part 51 and the sealant layer 11 at the second region 552, a secondary battery 200 having a battery package (battery packaging container) 55' including one member is obtained. That is, in the secondary battery 200 shown in FIG. 6B, by sealing the concave part 51 with the second region 552, an interior space for accommodating the battery is formed.

In FIG. 6B, a symbol 102 indicates an electrode lead which is connected to a positive electrode and a negative electrode of a lithium ion battery, like the case of FIG. 5.

In the secondary battery 200, like the case of the secondary battery 100, even when liquid exists in an interior space in which a lithium ion battery is accommodated, leakage of this liquid to the outside of the battery packaging container 55' is also suppressed.

Thus far, as the battery of the present invention, the battery which is obtained using the resin coated metal laminate 10 was illustrated, but when the resin coated metal laminates of other embodiments such as the resin coated metal laminates 20 to 30 are used, batteries exerting the same effect are also obtained.

EXAMPLES

The present invention will be illustrated below in more detail by way of specific examples. However, the present invention is not limited to examples shown below at all.
<Manufacturing of Resin Coated Metal Laminate>

Example 1

A resin coated metal laminate having the same configuration as that shown in FIG. 3 was manufactured.

First, as a substrate layer, a nylon film (nylon 6,6 film, manufactured by Toyobo Co., Ltd., thickness 6 µm) having the result of an Elmendorf tear strength test being a value described in Table 1 was prepared. After an ink having carbon black was coated on one surface of this substrate layer using a bar coater, this was dried at 70 to 80° C. using an oven, and thereby, a colored layer (thickness 2.0 µm) was formed.

Then, a surface on a side opposite to a surface of the above-mentioned substrate layer on which the colored layer had been formed was corona-treated, a mat layer-forming agent was coated on this corona-treated surface using a bar coater, and this was dried at 70 to 80° C., thereby, a mat layer (average thickness 5 µm) was formed on the other surface of the substrate layer. As the mat layer-forming agent, an agent, obtained by dispersing silica fine particles having an average particle diameter of 2.0 µm, acrylic resin fine particles having an average particle diameter of 5.0 µm, and a resin binder in a solvent at the mass ratio of 1:1:1, was used.

Then, a surface protecting agent was applied on a surface of the mat layer using a bar coater, and dried at 80° C. using an oven, and thereby, a surface protective layer (thickness 0.001 µm) was formed. As the surface protecting agent, a long chain alkyl pendant-type peeling agent having the solid content concentration of 0.003% by mass was used.

A laminate provided with the mat layer after formation was aging-treated at 40° C. for 8 hours, and thereby, a first intermediate laminate in which a colored layer, a substrate layer, a mat layer, and a surface protective layer are laminated in this order was obtained.

A corrosion-prevention treating agent was applied on both surfaces of stainless-steel foil (SUS 304, thickness 20 µm), and heat-dried at 200° C. using an oven, and thereby, a first corrosion-preventing layer (thickness 0.1 µm) was formed on one surface, and a second corrosion-preventing layer (thickness 0.1 µm) was formed on the other surface. As the corrosion-prevention treating agent, a mixture of chromium fluoride, phosphoric acid, and polyvinyl alcohol was used.

Then, by sticking an unstretched polypropylene (CPP) film (unstretched block polypropylene film having a melting point of 160° C., thickness 20 µm) to a surface of the first corrosion-preventing layer using an adhesive, a second adhesive layer (thickness 1.0 µm) was formed, and at the same time, a second intermediate laminate in which a sealant layer, a second adhesive layer, a first corrosion-preventing layer, a barrier layer, and a second corrosion-preventing layer are laminated in this order was obtained.

The adhesive was obtained by melting and kneading maleic anhydride-modified polypropylene and a phenol novolak-type epoxy resin having a bisphenol A structure (manufactured by Mitsubishi Chemical Corporation, product name: jER157S70, dynamic viscosity 80 cSt (80 mm$^2$/s, measured value in 50% dioxane solution), epoxy equivalent 210 g/eq) in toluene at room temperature for 10 minutes so that the quantity of the solid matter became 10%, and among it, the content of the above-mentioned maleic anhydride-modified polypropylene became 90% by mass, and the content of the above-mentioned phenol novolak-type epoxy resin became 10% by mass, and stirring a mixture to dissolve.

Then, a colored layer side of the first intermediate laminate and a second corrosion-preventing layer side of the second intermediate laminate were laminated by dry lamination using a urethane-based adhesive, thereby, a first adhesive layer (thickness 1.0 µm) was formed, and at the same time, a laminate was formed. The resulting laminate was aging-treated at 60° C. for 3 days.

From the above, a resin coated metal laminate provided with a sealant layer, a second adhesive layer, a first corrosion-preventing layer, a barrier layer, a second corrosion-preventing layer, a first adhesive layer, a colored layer, a substrate layer, a mat layer, and a surface protective layer in this order was obtained.

Examples 2 to 8, Comparative Examples 1 and 2, and Reference Example 1

According to the same manner as that of Example 1 except that any feature of the substrate layer, the barrier layer, the mat layer, and the surface protective layer was changed as shown in Table 1, resin coated metal laminates were manufactured. In addition, in Table 1, the description of "presence" concerning the mat layer and the surface protective layer means that the layer exists in the resin coated metal laminate, and the description of "absence" means that the layer does not exist in the resin coated metal laminate.

<Measurement of Tensile Strength>

Five rectangular parallelepiped test pieces having a width of 10 mm and a length of 50 mm, which are long in a length direction (MD) of a film, were prepared, and used as samples for MD direction.

Five rectangular parallelepiped test pieces having a width of 10 mm and a length of 50 mm, which are long in a width direction (TD) of a film, were prepared, and used as samples for TD direction.

An end of each test piece was chucked, and the tensile strength (unit: N/mm) was measured while the piece was drawn at a tensile speed of 30 mm/min., under the conditions of temperature and humidity of 23° C. and 55% using a tensile testing machine (Autograph AG-100: manufactured by Shimadzu Corporation).

Measurement was performed five times for each of the samples for MD direction and the samples for TD direction, and a maximum value thereof was used as the maximum value of the tensile strength.

<Elmendorf Tear Strength Test of Substrate Layer>

The Elmendorf tear strength test of the substrate layer used in the above-mentioned examples was performed by the following method.

That is, a monolayer film which is to be the substrate layer was excised to obtain a plurality of sample films having a width of 50 mm and a length of 64 mm. After these sample films were humidified for 24 hours under the condition of 23° C. and 55% RH, a MD direction (length direction) and a TD direction (width direction) of films were matched with each other, and only these films were laminated so that a total length became 100 µm, to obtain a laminated film (laminated test piece). The Elmendorf tear strength of this laminated film was measured in accordance with JIS K7128/ JIS P8116.

The Elmendorf tear strength was measured using a F9 tear testing machine manufactured by TOYO SEIKI Co., Ltd. The Elmendorf tear strength was measured concerning the case where the above-mentioned laminated film was torn in a MD direction thereof, and the case where the laminated film was torn in a TD direction, respectively, under the condition of 23° C. and 55% RH, and was obtained as an average of these measured values.

In addition, when a total thickness of the laminated films did not become 100 µm, films were laminated so that a total thickness became a value near 100 µm, and concerning the resulting laminated films (laminated test piece), the Elmendorf tear strength was measured, this actual measured value was substituted in the following conversion expression, and the resulting numerical value (converted value) was adopted as a measured value of the Elmendorf tear strength. For example, when a film having a thickness of 6.3 μm is used, the Elmendorf tear strength of laminated films obtained by overlapping 16 of the films was measured, and the converted value may be calculated.

In this way, the Elmendorf tear strength test was performed using laminated films having a total thickness of 100 μm, or a value near 100 μm, and a measured value when a thickness of laminated films is equivalent to 100 μm was obtained.

Conversion formula: [Converted value]=[actual measured value]×[100 (μm)]/[actual total thickness of laminated films whose total thickness was made to be a value near 100 μm (μm)]

From the resulting measured values (converted values), the Elmendorf tear strengths of the substrate layer were classified into any of three groups of the following A to C. The results are shown in Table 1.

A: 60 (g/100 μm equivalent lamination) or more
B: 20 (g/100 μm equivalent lamination) or more and less than 60 (g/100 μm equivalent lamination)
C: Less than 20 (g/100 μm equivalent lamination)

<Assessment of Resin Coated Metal Laminate>

As shown below, concerning the resin coated metal laminates obtained as described above, a rubbing test and a working suitability test by curling at the time of humidity variation were performed to conduct assessment. The results are shown in Table 1.

[Rubbing Test of Resin Coated Metal Laminate]

According to the method illustrated above, a rubbing test was performed using a rubbing tester (manufactured by Taiheirika Kogyo K.K.).

That is, first, the resin coated metal laminate was folded into two so that a surface of its outermost layer (that is, a surface protective layer) became convex. Furthermore, the sealant layers in which surfaces became to be mutually contacted by folding into two were heat-sealed, and used as a test piece. A width Wi of the test piece was made to be 20 cm.

Then, an outermost surface of a folded site of the test piece, which became convex, was arranged contacting with a side surface of a stainless-steel bar (diameter 1.5 cm) which was arranged horizontal with the rubbing tester. A load of 200 g was applied to the test piece, and the test piece was rubbed by repeatedly reciprocating it along a longitudinal direction of the stainless-steel bar while the test piece was pushed against a side surface of the stainless-steel bar. A one way distance $L_1$ of reciprocation at this time was made to be 10.0 cm in all cases, and the necessary time for moving a distance $L_1$, that is, the necessary time for moving one stroke was made to be 1 second.

Then, a site of the test piece which had been rubbed with the stainless-steel bar and sites in the vicinity thereof were observed visually, the presence or absence of destruction of the substrate layer, and when the substrate layer was destructed, times of reciprocation leading to destruction were confirmed, and the results were classified into any of three groups of the following ⊚, ○, and x. In addition, at this time, when exposure of a layer adjacent to the substrate layer (herein, colored layer) was seen, this was determined that the substrate layer was destructed.

⊚: Even when the test piece was reciprocated 300 times or more, the substrate layer was not destructed.
○: When the test piece was reciprocated 100 times or more and less than 300 times, the substrate layer was destructed.
x: When the test piece was reciprocated less than 100 times, the substrate layer was destructed.

[Curling at the Time of Humidity Variation of Resin Coated Metal Laminate]

The resin coated metal laminate was excised into a size of 50 mm×50 mm, the resin coated metal laminate was placed on a horizontal surface so that the sealant layer was on a lower side, a weight was placed on the resin coated metal laminate so that an end face of the resin coated metal laminate was projected 1.5 cm, and this was allowed to stand for 24 hours under the condition of 25° C. and humidity of 10%. Then, a starting height (curling value) of an end face of the resin coated metal laminate was measured, and an extent of curling was assessed from absolute values of these measured values according to the following criteria.

⊚: An absolute value is less than 3.0 mm
○: An absolute value is 3.0 mm or more and less than 6.0 mm.
x: An absolute value is 6.0 mm or more.

TABLE 1

| | Substrate layer | | | | | | | Physical properties of resin coated metal laminate | | | |
|---|---|---|---|---|---|---|---|---|---|---|---|
| | Barrier layer | | | | Tensile strength (N/mm) | | Elmendorf tear strength test | Mat layer | Surface protective layer | Rubbing test (reciprocation) | Curling at humidity variation |
| | Constituent material | Thickness (μm) | Constituent material | Thickness (μm) | MD | TD | | | | | |
| Example 1 | Stainless | 30 | Nylon | 25 | 50 | 45 | A | Presence | Presence | ⊚ | ○ |
| Example 2 | Stainless | 30 | Nylon | 25 | 35 | 15 | B | Presence | Presence | ○ | ○ |
| Example 3 | Stainless | 30 | Nylon | 25 | 25 | 25 | B | Presence | Presence | ○ | ○ |
| Example 4 | Stainless | 30 | Nylon | 25 | 35 | 15 | B | Presence | Absence | ○ | ○ |
| Example 5 | Stainless | 30 | Nylon | 25 | 25 | 25 | B | Absence | Absence | Δ | ○ |
| Example 6 | Stainless | 30 | Nylon | 6 | 25 | 24 | B | Presence | Presence | ○ | ○ |
| Example 7 | Stainless | 15 | Nylon | 6 | 25 | 24 | B | Presence | Presence | ○ | ○ |
| Example 8 | Stainless | 50 | Nylon | 25 | 50 | 45 | B | Presence | Presence | Δ | X |
| Comparative Example 1 | Stainless | 30 | Nylon | 25 | 22 | 20 | B | Presence | Presence | X | ○ |
| Comparative Example 2 | Stainless | 30 | Nylon | 35 | 55 | 49 | B | Presence | Presence | ⊚ | X |
| Reference Example 1 | Aluminum | 30 | Nylon | 25 | 24 | 20 | B | Presence | Presence | ○ | ○ |

As apparent from the above results, since the resin coated metal laminates of Examples 1 to 8 used, as the substrate layer, a polyamide film which is thinner than the barrier layer, and has a maximum value of the tensile strength of 25 N/mm or more, the results of the rubbing test were good.

The resin coated metal laminate of Comparative Example 1 used, as substrate layer, a film having a maximum value of the tensile strength of less than 25 N/mm, and as a result of the rubbing test, a substrate layer fracture or break was seen.

The resin coated metal laminate of Comparative Example 2 used, as the substrate, a film which is thicker than the barrier layer, the results of the rubbing test were good, but at humidity variation, the resin coated metal laminate remarkably curled, and it was confirmed that later working suitability is inferior. It is presumed that this is because since nylon in the substrate layer is expanded and contracted in an in-plane direction of the film due to variation of humidity, curling was generated by expansion and contraction of the substrate layer due to a thick substrate layer.

Meanwhile, the resin coated metal laminate of Reference Example 1 is such that the barrier layer does not include stainless steel, but includes aluminum. From the results of Reference Example 1, it is seen that the resin coated metal laminate of the present invention solved the previous problems when stainless steel is used as a constituent material of the barrier.

The present invention can be utilized in a package or a wrapper for daily necessities such as foods, drinks, cosmetics, medicaments, and batteries, and is particularly suitable for utilization in a package of batteries.

DESCRIPTION OF THE REFERENCE NUMERALS 10, 20, 30: Resin coated metal laminate (test piece)
10a: Twofold site of resin coated metal laminate
10a': Folded site of resin coated metal laminate
11: Sealant layer
12: Corrosion-preventing layer (first corrosion-preventing layer)
13: Barrier layer
13a: Twofold site of barrier layer
22: Second corrosion preventing layer
14: Adhesive layer (first adhesive layer)
24: Second adhesive layer
15: Substrate layer
15a: Twofold site of substrate layer
16: Colored layer
17: Mat layer
18: Surface protective layer
30a: Twofold site of test piece
81: Stainless-steel bar
81a: Side surface of stainless-steel bar
55', 90: Battery package (battery packaging container)
91: Container body
51: Concave part
52: Periphery
55: Molded body
551: First region of molded body
552: Second region of molded body
511, 911: Convex site
92: Lid part
99: Peripheral part
100, 200: Secondary battery
101: Lithium ion battery

What is claimed is:

1. A resin coated metal laminate comprising at least a sealant layer, an adhesive layer, a corrosion-preventing layer, a barrier layer, a colored layer, a substrate layer, a mat layer, and a surface protective layer in this order, wherein
the barrier layer includes stainless steel having a thickness of 30 µm or less,
the substrate layer includes a polyamide as a main component,
a thickness of the substrate layer is thinner than a thickness of the barrier layer,
a tensile strength in a tensile test of the substrate layer is 25 N/mm or more in at least one of a length direction and a width direction,
a thickness of the surface protective layer is 0.0001 to 0.01 µm,
the corrosion-preventing layer is formed using a corrosion-preventing treating agent which is a mixture of chromium fluoride, phosphoric acid, and polyvinyl alcohol,
the adhesive layer is formed using an adhesive which comprises a maleic anhydride-modified polypropylene and a phenol novolak-type epoxy resin having a bisphenol A structure, and
the surface protective layer consists essentially of a polymer of a long chain alkyl group-containing vinyl monomer, wherein a contact angle of a surface of the surface protective layer to methyl ethyl ketone is 10° to 50°.

2. The resin coated metal laminate according to claim 1, wherein a result of an Elmendorf tear strength test concerning a laminated test piece obtained by laminating only the substrate layer so that a total thickness becomes equivalent to 100 µm is 20 (g/100 µm equivalent lamination) or more.

3. The resin coated metal laminate according to claim 1, wherein the thickness of the substrate layer is 15 µm or less.

4. The resin coated metal laminate according to claim 1, wherein the mat layer contains fine particles.

5. The resin coated metal laminate according to claim 1, further comprising an adhesive layer on one surface of the colored layer, wherein
the adhesive layer includes adhesive (i), adhesive (ii) or adhesive (iii) below:
the adhesive (i): urethane-based adhesive;
the adhesive (ii): adhesive including a mixture of a polyolefin-based resin as a base resin and isocyanate as a curing agent; and
the adhesive (iii): adhesive including a mixture of a polyolefin-based resin as a base resin and an epoxy-based resin as a curing agent.

6. The resin coated metal laminate according to claim 1, which is for use in battery packaging.

7. A battery package comprising a resin coated metal laminate as defined in claim 6, wherein
the battery package has an interior space for accommodating a battery, and
a sealant layer side of the resin coated metal laminate becomes a side of the interior space.

8. A battery comprising a battery package as defined in claim 7.

9. A resin coated metal laminate comprising at least a sealant layer, an adhesive layer, a corrosion-preventing layer, a barrier layer, a colored layer, a substrate layer, a mat layer, and a surface protective layer in this order, wherein
the barrier layer includes stainless steel having a thickness of 30 µm or less,
a thickness of the surface protective layer is 0.0001 to 0.01 µm, the corrosion-preventing layer is formed using a corrosion-preventing treating agent which is a mixture of chromium fluoride, phosphoric acid, and polyvinyl alcohol, the adhesive layer is formed using an adhesive which comprises a maleic anhydride-modified polypropylene and a phenol novolak-type epoxy resin having a bisphenol A structure, the surface protective layer consists essentially of a polymer of a long chain alkyl group-containing vinyl monomer, wherein a contact angle of a surface of the surface protective layer to methyl ethyl ketone is 10° to 50°, and exposure of a layer adjacent to the substrate layer associated with destruction of the substrate layer is not seen as a result of a rubbing test below:

the rubbing test: a test piece is prepared by folding the resin coated metal laminate into two so that a surface on a side opposite to a side of the substrate layer on which the sealant layer is provided becomes convex, an outermost surface of a twofold site of the test piece is contacted with a smooth side of a stainless-steel bar having a diameter of 1.5 cm, to arrange the test piece, and the test piece is rubbed by reciprocating the test piece 99 times a distance of one-way 10.0 cm in a longitudinal direction of the stainless-steel bar, while applying a load of 200 g to the test piece.

* * * * *